Figure 1:
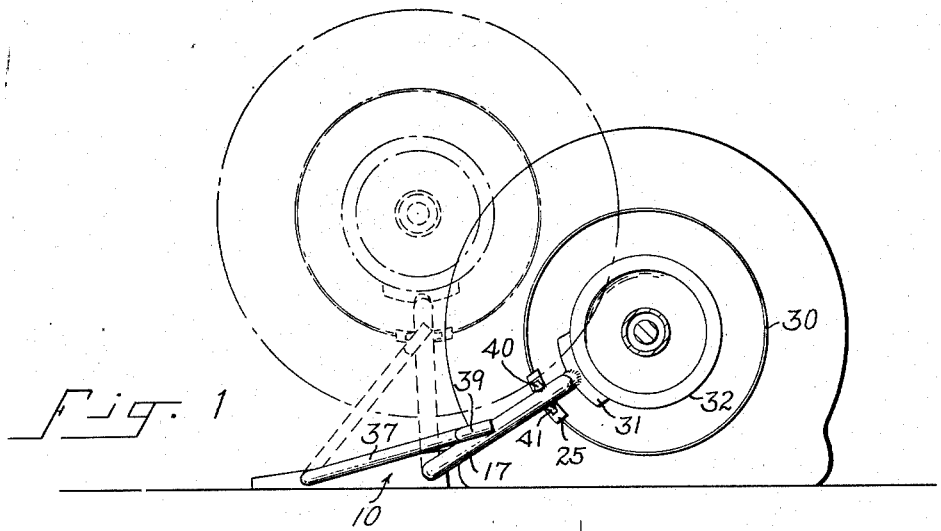

Sept. 19, 1950     B. F. RANDRUP     2,522,801

ROLL-ON JACK

Filed Feb. 28, 1948

INVENTOR.
Benjamin F. Randrup
BY
Attorney

Patented Sept. 19, 1950

2,522,801

UNITED STATES PATENT OFFICE 2,522,801

ROLL-ON JACK

Benjamin F. Randrup, Portland, Oreg.

Application February 28, 1948, Serial No. 11,941

11 Claims. (Cl. 254—88)

My present invention comprises a roll-on jack for raising a vehicle wheel from the ground while the wheel is mounted on a vehicle, the same being of particular utility in elevating pneumatic-tired vehicle wheels when a puncture or a blow-out causes the pneumatic tire to be deflated.

It is well known that modern vehicles are so arranged that it is extremely difficult to elevate a wheel from the ground with most jacks and for some people it is impossible. Many different types of jacks have been devised in an attempt to overcome this difficulty. One such type comprises a toggle device operated by a screw turned by a long handle which, while being capable of operation by a strong man, cannot be operated by the ordinary woman or child. Even when the operator has sufficient strength it is very difficult to place such a jack and cause its initial elevation prior to the engagement of the jack saddle with a portion of the axle. Another device comprises the so-called bumper jack which is subject to the fault that most vehicles have such limber springs that a great lift is required of the jack before the wheel can be elevated and after elevation the vehicle is so precariously balanced that an operator is always constantly in danger, and frequently the jack slips from its position, lowering the vehicle to the ground with the wheel removed and making it impossible for subsequent elevation to be accomplished without tremendous effort or the use of other types of jacks. Regardless of the type of jack employed, an operator is always in danger whenever he must be close to the wheel being elevated as is the case with all prior devices for such purpose.

The principal object of the present invention is to provide a jack which may be attached to the rim of a wheel and caused to elevate the wheel by moving the vehicle forward or backward under its own power.

Another object of the present invention is to provide a jack of the character described which automatically elevates the wheel without requiring a person to be nearby, thus removing a common cause of serious accidents.

A further object of the present invention is to provide a roll-on jack which may be quickly and firmly associated with a wheel, which has a portion which may be quickly and safely removed from the outer periphery of the wheel to permit dismounting of the rim and tire while the remainder of the jack firmly holds the wheel in elevated position.

The objects and advantages of the present invention will be more readily ascertained from inspection of the following specification taken in connection with the accompanying drawing wherein like numerals refer to like parts throughout, while the features of novelty will be more distinctly pointed out in the appended claims.

Figure 2:
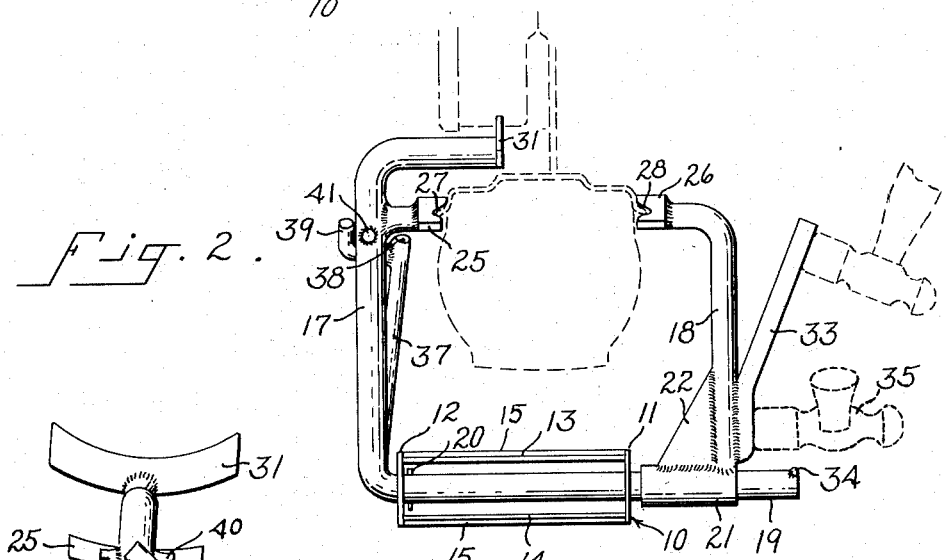
Figure 3:
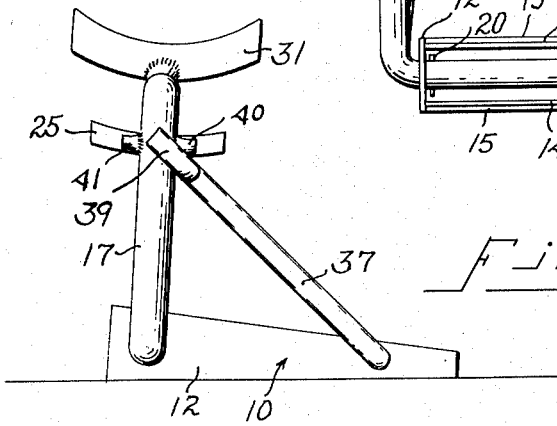

In the drawing Fig. 1 is a view in side elevation taken from the inside of a wheel mounted on a vehicle, showing the jack in the position it occupies when attached to a "flat" tired wheel in full line, and in elevated position in dotted line;

Fig. 2 is a front elevation of the jack showing a wheel elevated thereby in dotted outline, and showing the method of clamping the jack to a rim and of unclamping the outer portion of the jack by the use of a hammer shown in dotted outline; and Fig. 3 is a side elevation of the jack in elevated position taken from the left side of Fig. 2.

The jack comprises a base generally indicated by the numeral 10, the same preferably comprising a pair of wedge-shaped side plates 11 and 12 which are joined by connecting plates 13 and 14 to make a segmental frame adapted to lie on the ground with either plate 13 or 14 in contact therewith. The plates 11 and 12 preferably extend beyond the outer surfaces of plates 13 and 14 to make ground-gripping flanges, and the plates 13 and 14 are preferably provided with lateral cleats 15 to prevent slippage of the surface in contact with the ground.

A cradle comprising a pair of arms 17 and 18 is pivotally supported upon the base 10, the arms 17 and 18 being rotatable with respect to the base and being movable apart from and toward each other. A preferred arrangement comprises having a pivot portion 19 of arm 17 extending at right angles to the supporting portion thereof and passing through the base, the portion 19 being journaled in openings in plates 11 and 12 and lying between plates 13 and 14. A pin 20 or equivalent is provided to prevent the portion 19 from being withdrawn from the base, the pin lying close to the side wall 12 so as to hold the portion 19 projecting laterally from the other side of the base. The arm 18 is mounted upon a sleeve 21 which loosely, but snugly, embraces the pivot portion 19 of the opposite arm, being braced by a gusset 22 welded into the angle between the sleeve and the upright portion of the arm. The arm is mounted at the outer end of the sleeve 21.

Each of the arms supports an arcuate clamping jaw, one such jaw 25 projecting inwardly toward the base from an intermediate portion of the arm 17, and the opposed jaw 26 projecting inwardly from the free end of arm 18. Jaw 25 is provided with an inwardly facing groove 27 and the jaw 26 with a similar groove 28, each groove lying along an arc corresponding to the rim 30 of the wheel for which the jack is designed. The upper and lower surfaces of each groove preferably converge inwardly so that rotation of the wheel tends to wedge the jaw outwardly and thus more firmly lock the sleeve onto the portion 19. The free end of arm 17 is bent inwardly to overhang the base 10 and carries a support member such as an arcuate shoe 31 which is positioned and shaped to engage the periphery of the brakedrum 32 of the particular vehicle for which the jack is designed. An impact member 33 is welded to the outer surface of arm 18 adjacent the sleeve 21 and extends angularly upward alongside of the arm to a point spaced from the jaw 26. A nub 34 is formed on the free end of the portion 19 to keep the sleeve 21 from slipping off the end thereof.

In order to clamp the cradle to the rim of the vehicle the jack may be positioned adjacent the wheel as shown in full line in Fig. 1, care being taken to position the shoe 31 adjacent the brakedrum with the inner edge of the rim being received in the jaw 25. The arm 18 is then shifted inwardly to position the jaw 26 on the opposite edge of the rim adjacent the jaw 25. The impact member 33 may be struck a sharp blow adjacent the sleeve 21 by a hammer 35 or similar implement, which will cause the sleeve 21 to cant while sliding inwardly to its fullest extent, the sleeve thereby becoming locked to the portion 19 with the rim firmly clamped between the two jaws. The arms 17 and 18 are of such length that the cradle may be clamped to the rim with the arms extending angularly downward to the base which may be positioned upon the ground or hang angularly from the arms with its free end only in engagement with the ground.

When the rim is so clamped between the jaws an abutment on the base 10 is positioned to limit swinging movement of the cradle portion of the jack. This abutment may comprise several different forms, the preferred form herein illustrated comprising a rod 37 pivotally mounted in the forward portion of the base and terminating at its free end in a fork comprising an inner prong 38 and an outer prong 39 between which the arm 17 may be received. The vehicle may now be driven forward to cause the wheel to be lifted free of the ground by the arms 17 and 18 swinging forwardly. The abutment lever 37 will be lifted to the position shown in dotted outline and will arrest the cradle when the fork strikes a limit stop 40 or 41 provided on the arm 17. The parts are so proportioned that the cradle will be arrested after it has passed slightly beyond center as seen in Fig. 3 so that it will tend to remain in the desired position. At this point the tire is lifted from the ground and the wheel may be detached from the brakedrum. The jaws of the cradle resist turning movement of the wheel so that difficult attaching studs may be easily released. Before or after loosening the studs the jaws may be separated by striking the impact lever 33 at its free end as illustrated by the hammer shown in the upper position in dash lines in Fig. 2, thus causing the sleeve 21 to be loosened upon the portion 19 so that it may be slid outward and the arm 18 dropped to the ground. The wheel will remain in elevated position due to the supporting shoe 31 having engaged the brakedrum. After replacement of a substitute wheel the vehicle may be driven back to engage the ground, with or without reclamping the rim between the jaws.

It will be noted that the base 10 is free to turn from one side to the other so that the jack may be used on either the front or rear wheels and on either side of the vehicle. The limit arm 37 is also free to be reversed in position depending upon the direction in which the base 10 extends.

A feature to be observed is that the upper lip of jaw 25 overhangs the lower lip so that a guide is presented to aid in positioning the inner jaw. Also the jaws are of such arcuate length that the force of elevating the wheel tends to lock the sleeve 21 more firmly to the portion 19.

Having illustrated and described a preferred form of my invention, it should be apparent to those skilled in the art that the invention permits of modification in arrangement and detail. I claim as my invention all such modifications as come within the true spirit and scope of the appended claims.

I claim:

1. A roll-on jack for raising a pneumatic-tired vehicle wheel from the ground while the wheel is mounted on a brakedrum of a vehicle, comprising a cradle adapted to be clamped onto the rim of the wheel with the cradle extending around the tire thereon, and a base pivotally supporting said cradle, said cradle including a first arm terminating in a supporting shoe engageable with the brakedrum and an inner jaw beneath said shoe adapted to engage the inner edge of the rim, and a second arm terminating in an outer jaw adapted to engage the outer edge of the rim.

2. A roll-on jack for raising a pneumatic-tired vehicle wheel from the ground while the wheel is mounted on a brakedrum of the vehicle, comprising a cradle adapted to be clamped onto the rim of the wheel and including a pair of clamping arms, and a base pivotally supporting said cradle, said arms being of such length that when said base is in engagement with the ground the arms may extend diagonally toward the ground and when said arms extend vertically above said base the tire is lifted clear of the ground between said arms, one of said clamping arms including an outwardly facing arcuate jaw adapted to engage the inner edge of the rim and the other of said arms including an inwardly facing arcuate jaw adapted to engage the outer edge of the rim.

3. A roll-on jack for raising a pneumatic-tired vehicle wheel from the ground while the wheel is mounted on a brakedrum of the vehicle, comprising a cradle adapted to be clamped onto the rim of the wheel and including a pair of clamping arms, and a base pivotally supporting said cradle, said arms being of such length that when said base is in engagement with the ground the arms may extend diagonally toward the ground and when said arms extend vertically above said base the tire is lifted clear of the ground between the arms, one of said clamping arms including an outwardly facing arcuate jaw adapted to engage the inner edge of the rim and the other of said arms including an inwardly facing arcuate jaw adapted to engage the outer edge of the rim, at least one of said arms being movable toward and from the other of said arms, and the other of said arms comprising a supporting shoe engageable with the brakedrum.

4. A roll-on jack for raising a pneumatic-tired vehicle wheel from the ground when the wheel is mounted on a brakedrum of the vehicle, comprising a cradle adapted to be clamped onto the rim of the wheel, said cradle including a pair of arms movable toward and away from each other and including arcuate jaws adapted to engage opposite edges of the rim, and a shoe mounted on one of said arms in position to engage the periphery of the brakedrum.

5. A roll-on jack for jacking up a vehicle wheel having a pneumatic tire thereon, comprising a base, an arm supported by said base and including a pivot portion pivotally attached to said base and a supporting portion, a supporting shoe carried at the free end of said supporting portion and overhanging said base, a rim-clamping jaw mounted on said arm beneath said shoe, a second arm pivotally mounted on said base, and a movable rim-clamping jaw mounted on said second arm.

6. A roll-on jack for jacking up a vehicle wheel having a pneumatic tire thereon, comprising a base, an arm pivotally supported by said base and including a pivot portion passing laterally through said base and a supporting portion at right angles to said pivot portion, an arcuate shoe carried at the free end of said supporting portion and overhanging said base, an arcuate rim-clamping jaw mounted on said arm beneath said arcuate shoe, and a second arm pivotally mounted on said base and comprising a movable, arcuate, rim-clamping jaw.

7. A roll-on jack for jacking up a vehicle wheel having a pneumatic tire thereon, comprising a base, an arm pivotally supported by said base and including a pivot portion passing laterally through said base and a supporting portion at right angles to said pivot portion, an arcuate shoe carried at the free end of said supporting portion and overhanging said base, a rim-clamping jaw mounted on said arm beneath said shoe, a second arm pivotally and slidably supported on said pivot portion, and a second rim-clamping jaw mounted on said second arm.

8. A roll-on jack for jacking up a vehicle wheel having a pneumatic tire thereon, comprising a base, an arm pivotally supported by said base and including a pivot portion passing laterally through and extending beyond said base and a supporting portion at right angles to said pivot portion, a support member carried at the free end of said supporting portion and overhanging said base, a first rim-clamping jaw mounted on said arm beneath said support member, a slide surrounding the extending end of said pivot portion, a second arm fixed to said slide and extending at right angles thereto, and a second rim-clamping jaw mounted on said second arm.

9. A roll-on jack for jacking up a vehicle wheel having a pneumatic tire thereon, comprising a base, an arm pivotally supported by said base and including a pivot portion passing laterally through and extending beyond said base and a supporting portion at right angles to said pivot portion, an arcuate shoe carried at the free end of said supporting portion and overhanging said base, an arcuate rim-clamping jaw mounted on said arm beneath said arcuate shoe, a tubular slide surrounding the extending end of said pivot portion, and a second arm fixed to said slide and extending at right angles thereto, said second arm comprising a movable arcuate rim-clamping jaw, and an impact member fixed to said second arm and extending angularly alongside thereof, said impact member being adapted to be struck close to said slide to lock said slide at its inner position when a rim is engaged between said clamping jaws and to unlock said slide when struck at a point remote therefrom.

10. A roll-on jack for jacking up a vehicle wheel having a pneumatic tire thereon and including a brakedrum, comprising a base, an arm pivotally supported by said base and including a pivot portion passing laterally through and extending beyond said base and a supporting portion at right angles to said pivot portion, an arcuate shoe carried at the free end of said supporting portion and overhanging said base in position to engage said brakedrum, a rim-clamping jaw mounted on said arm beneath said arcuate shoe, a tubular slide surrounding the extending end of said pivot portion, and a second arm fixed to said slide and extending at right angles thereto, said second arm comprising a movable rim-clamping jaw, each of said jaws having an arcuate slot thereon shaped to embrace a portion of the wheel rim.

11. The construction set forth in claim 10 in which the sides of said slots converge inwardly.

BENJAMIN F. RANDRUP.

REFERENCES CITED

The following references are of record in the file of this patent:

UNITED STATES PATENTS

| Number | Name | Date |
|---|---|---|
| Re. 21,560 | Mizer | Sept. 10, 1940 |
| 2,184,061 | Skroback | Dec. 19, 1939 |
| 2,415,018 | McDonald | Jan. 28, 1947 |